(12) United States Patent
Kageyama

(10) Patent No.: US 8,147,103 B2
(45) Date of Patent: Apr. 3, 2012

(54) FLASHER AND STRADDLE TYPE VEHICLE EQUIPPED WITH THE SAME

(75) Inventor: Kouji Kageyama, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 325 days.

(21) Appl. No.: 12/354,193

(22) Filed: Jan. 15, 2009

(65) Prior Publication Data

US 2009/0185388 A1 Jul. 23, 2009

(30) Foreign Application Priority Data

Jan. 18, 2008 (JP) .................. 2008-009844

(51) Int. Cl.
*F21V 33/00* (2006.01)
*B62J 6/00* (2006.01)

(52) U.S. Cl. ........ 362/473; 362/475; 362/496; 362/498; 362/506

(58) Field of Classification Search .................. 362/473, 362/475, 496, 498, 499, 506, 507, 540, 541, 362/542
See application file for complete search history.

(56) References Cited

U.S. PATENT DOCUMENTS

| | | | | | |
|---|---|---|---|---|---|
| 2,218,408 | A | * | 10/1940 | Meyerhoefer | 340/815.69 |
| 3,355,581 | A | * | 11/1967 | Fleming | 362/549 |
| 3,941,994 | A | * | 3/1976 | Petty et al. | 362/506 |
| 4,019,171 | A | * | 4/1977 | Martelet | 340/432 |
| 4,204,191 | A | * | 5/1980 | Daniels | 340/432 |
| 5,713,653 | A | * | 2/1998 | White et al. | 362/473 |
| 6,120,167 | A | * | 9/2000 | Nace | 362/473 |
| 6,951,416 | B2 | * | 10/2005 | Sazuka et al. | 362/538 |
| 2003/0067781 | A1 | * | 4/2003 | Kajitori et al. | 362/473 |
| 2004/0130906 | A1 | * | 7/2004 | Arakawa et al. | 362/506 |
| 2005/0013138 | A1 | * | 1/2005 | Miyagawa et al. | 362/473 |
| 2005/0018440 | A1 | * | 1/2005 | Koike et al. | 362/487 |
| 2005/0185415 | A1 | | 8/2005 | Kouchi et al. | |
| 2008/0130303 | A1 | * | 6/2008 | Medina et al. | 362/475 |
| 2008/0158895 | A1 | * | 7/2008 | Onoda et al. | 362/473 |

FOREIGN PATENT DOCUMENTS

| | | |
|---|---|---|
| DE | 199 43 886 A1 | 3/2001 |
| DE | 20 2004 019278 U1 | 4/2005 |
| JP | 2005-235622 A | 9/2005 |

OTHER PUBLICATIONS

European Office Action citing references submitted in this Information Disclosure Statement.

* cited by examiner

*Primary Examiner* — Anabel Ton
*Assistant Examiner* — Danielle Allen
(74) *Attorney, Agent, or Firm* — Keating & Bennett, LLP

(57) ABSTRACT

According to some embodiments, a flasher 101 to be mounted on a rear portion of a straddle type vehicle includes a lens 120, a cover 160 mated with the lens 120, and a leg 180 connecting the cover 160 with a vehicle body. A mating face of the cover 160 and the lens 120 is slanted with respect to a direction in which the leg 180 extends. The lens 120 is shorter in a vehicle widthwise direction than in a vehicle lengthwise direction.

20 Claims, 6 Drawing Sheets

FLASHER AND STRADDLE TYPE VEHICLE EQUIPPED WITH THE SAME

This application claims priority under 35 U.S.C. §119 to Japanese Patent Applications No. 2008-009844 filed on Jan. 18, 2008, the entire disclosure of which is incorporated herein by reference in its entirety.

BACKGROUND

1. Field of the Invention

The preferred embodiments of the present invention relates, inter alia, to a flasher (rear flasher) configured to be installed at a rear portion of a straddle type vehicle, and a straddle type vehicle equipped with the flasher.

2. Description of the Related Art

The following description sets forth the inventor's knowledge of related art and problems therein and should not be construed as an admission of knowledge in the prior art.

A flasher (rear flasher) configured to be installed at a rear portion of a straddle type vehicle is disclosed in, for example, Japanese Unexamined Patent Application Publication No. 2005-235622. This publication discloses a flasher installed at a rear portion of a straddle type vehicle. The flasher has a flasher body protruded from a vehicle body cover and a lens attached to the flasher body, and is configured such that the mating face of the body and the lens is slanted relative to the right-and-left direction of the vehicle body.

A flasher (rear flasher) installed at a rear portion of a straddle type vehicle is a particularly easy-to-break portion in the event of falling down of the vehicle.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a flasher enhanced in resistance to breakage at the time of falling down of the vehicle and improved in conspicuity.

Among other potential advantages, some embodiments can provide a straddle type vehicle equipped with a flasher enhanced in resistance to breakage at the time of falling down of the vehicle and improved in conspicuity.

According to a first aspect of a preferred embodiment of the present invention, a flasher is configured to be mounted on a rear portion of a straddle type vehicle. The flasher includes a lens, a cover mated with the lens, and a leg connecting the cover with a vehicle body. A mating face of the cover and the lens is slanted with respect to a direction in which the leg extends. Furthermore, the lens is shorter in a vehicle widthwise direction than in a vehicle front-and-rear direction.

According to the flasher, as mentioned above, the mating face of the cover and the lens is slanted with respect to a direction in which the leg extends and that the lens is shorter in a vehicle widthwise direction than in a vehicle front-and-rear direction. This improves conspicuity of the flasher and enhances the resistance to breakage in the event of falling down of the vehicle.

In the flasher, it is preferable that a mating face of a peripheral edge of the cover and a peripheral edge of the lens extends along a side surface of the vehicle body.

It is preferable that a mating face of a peripheral edge of the cover and a peripheral edge of the lens is formed by two mating faces including a front side mating face and a rear side mating face formed at a rear side and a front side of the flasher, respectively, and the front side mating face is more oriented toward a rear side of the vehicle than the rear side mating face.

The lens can be formed such that a front side of the lens protrudes more outwardly in a vehicle widthwise direction than a rear side of the lens.

According to a second aspect of a preferred embodiment of the present invention, a straddle type vehicle is equipped with any one of the flashers mentioned above.

In the straddle type vehicle having a tandem footrest and a grab bar, it is preferable that, when viewed from a rear side of the vehicle, the flasher is disposed inside of a line connecting vehicle widthwise outermost ends of the tandem footrest and the grab bar.

In the straddle type vehicle having a side cover disposed under a seat, it is preferable that the flasher is disposed inside of a vehicle widthwise outermost position of the side cover.

In the straddle type vehicle having a muffler disposed along a side surface of the vehicle body, it is preferable that the flasher is disposed inside of a vehicle widthwise outermost end of the muffler.

In the straddle type vehicle having a tail lamp provided at a rear portion of the vehicle body, it is preferable that the lens of the flasher is disposed outside of a vehicle widthwise outermost end of the tail lamp.

In the straddle type vehicle, a surface of the vehicle body on which the leg of the flasher is mounted is preferably oriented toward a rear side of the vehicle.

In the straddle type vehicle, it is preferable that a front end portion and a rear end portion of the flasher are gradually tapered toward a front end and a rear end of the vehicle, respectively.

In the straddle type vehicle, it is preferable that the rear end portion of the flasher is more sharply angled than the front end portion of the flasher.

In the straddle type vehicle having a tail lamp provided at a rear portion of the vehicle, it is preferable that the tail lamp has a side portion extending forward along a side surface of the vehicle, and that the lens of the flasher extends at a side surface of the vehicle along the side portion of the tail lamp.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Figure 1:
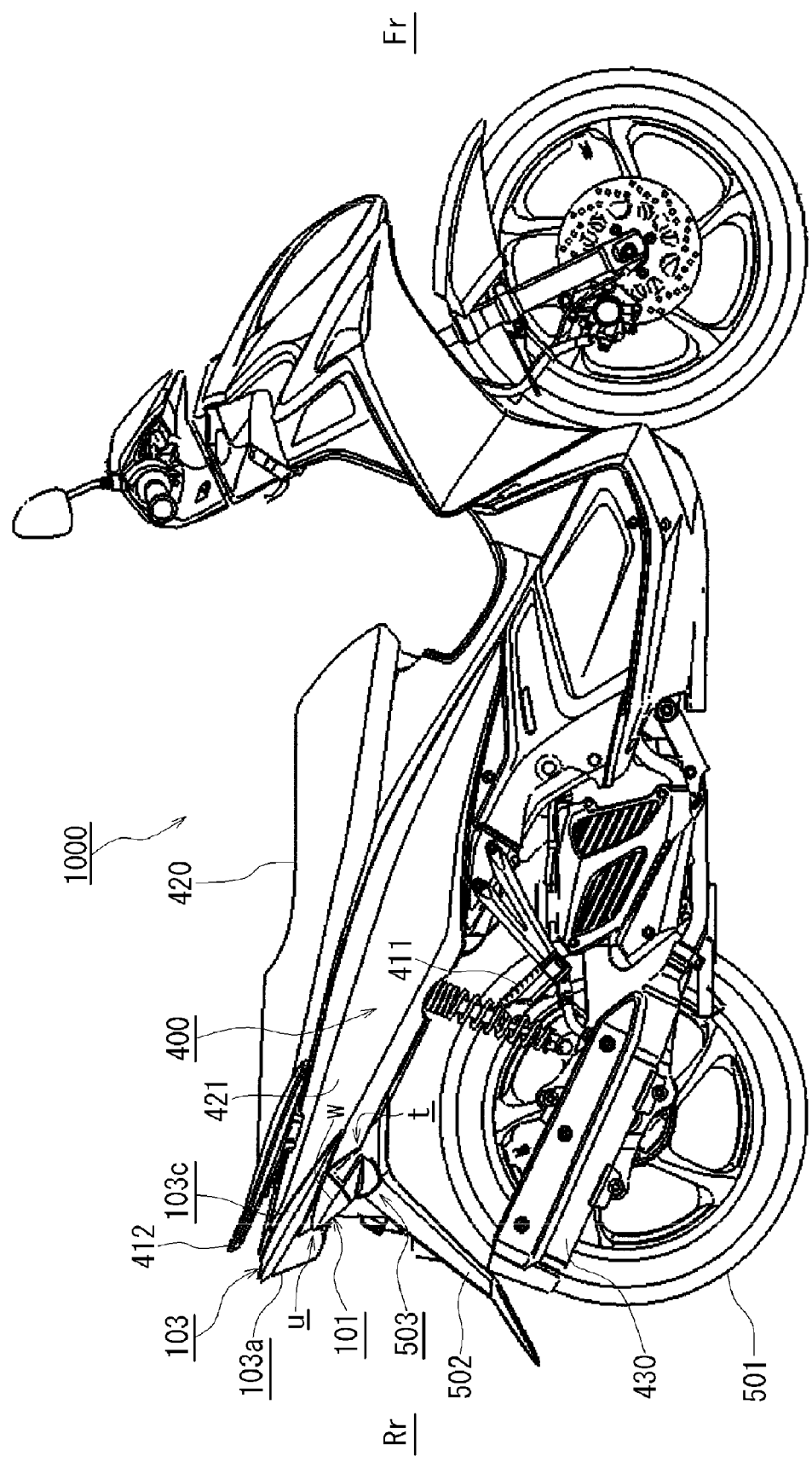
FIG. 1 is a right side view of a straddle type vehicle according to an embodiment of the present invention.

In the following paragraphs, some preferred embodiments of the invention will be described by way of example and not limitation. It should be understood based on this disclosure that various other modifications can be made by those in the art based on these illustrated embodiments.

A straddle type vehicle according to an embodiment of the present invention will be described below with reference to the drawings. In the drawings, the same numerals are used to designate a component or portion which performs the same functions. It should be noted that the present invention is not limited to the embodiment below. In this disclosure, the terms "front", "rear", "left", "right", "upper", or "lower" are those as viewed from a driver riding on the vehicle in the normal riding position. In some instances, the vehicle front and rear sides are indicated by Fr and Rr, respectively. The drawings are drawn so as to be viewed in such a manner that the numerals are oriented in the proper direction.

Figure 2:
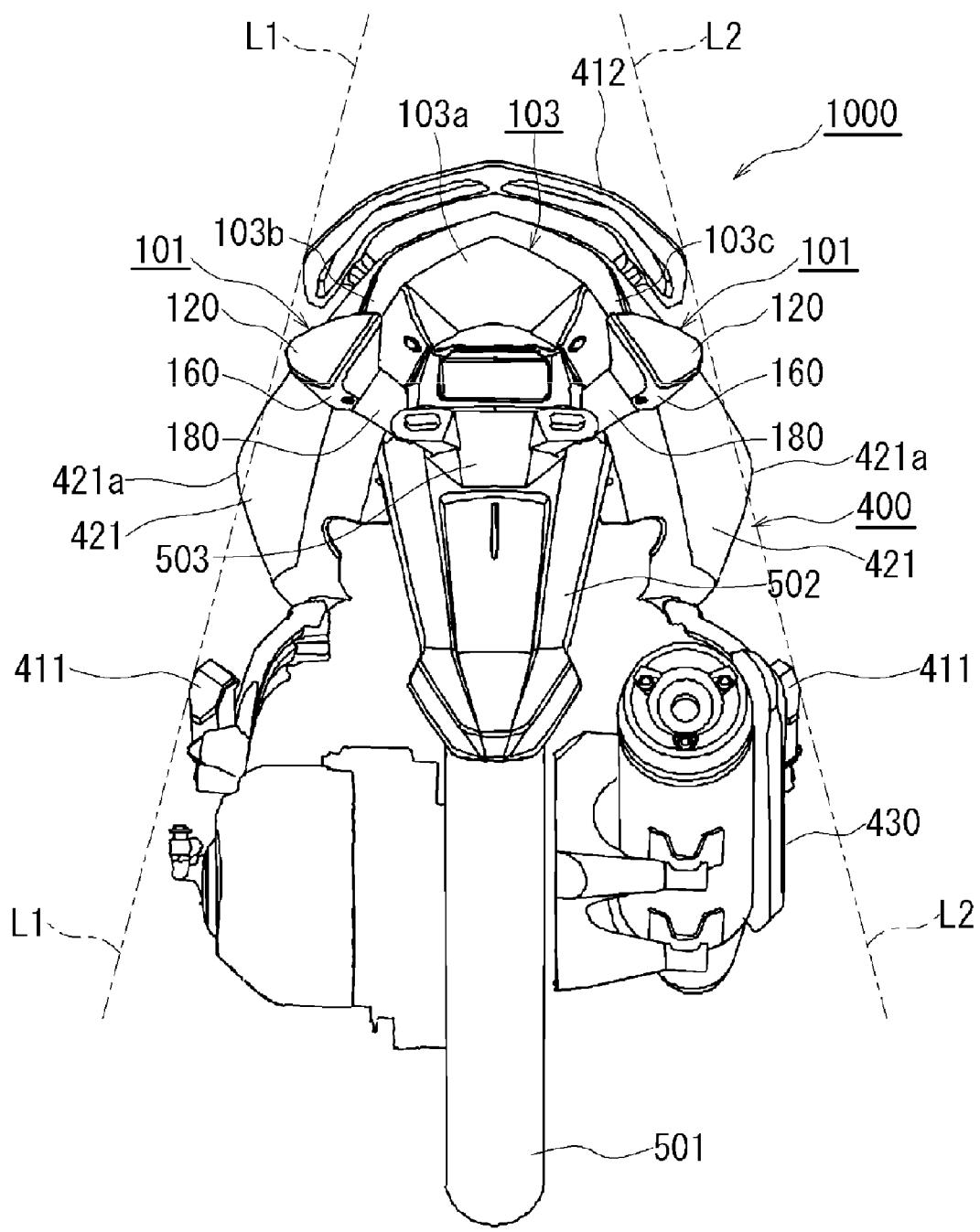
FIG. 2 is a rear view of the straddle type vehicle according to the embodiment of the present invention.

In an illustrative embodiment, as shown in FIG. 1, the straddle type vehicle 1000 is a scooter type motorcycle having a resin vehicle body cover 400 installed on the body frame (not shown) thereof. As shown in FIG. 2, the straddle type vehicle 1000 includes a tail lamp 103 and flashers 101 installed at the rear portion thereof. The tail lamp 103 mainly functions as a brake lamp and the flasher 101 mainly functions as a direction indicator lamp. FIG. 2 is a drawing of the straddle type vehicle 1000 as viewed from the rear thereof, showing in a simplified manner for the sake of convenience. In particular, parts inside the vehicle body cover 400 are omitted. The external components including the vehicle body cover 400, the tail lamp 103, and the flashers 101 are substantially mounted on the body frame (not shown) with brackets, respectively. This prevents these external components from rattling due to air flow and/or vibration resulting from vehicle operations, thereby ensuring required mounting strength.

Figure 3:
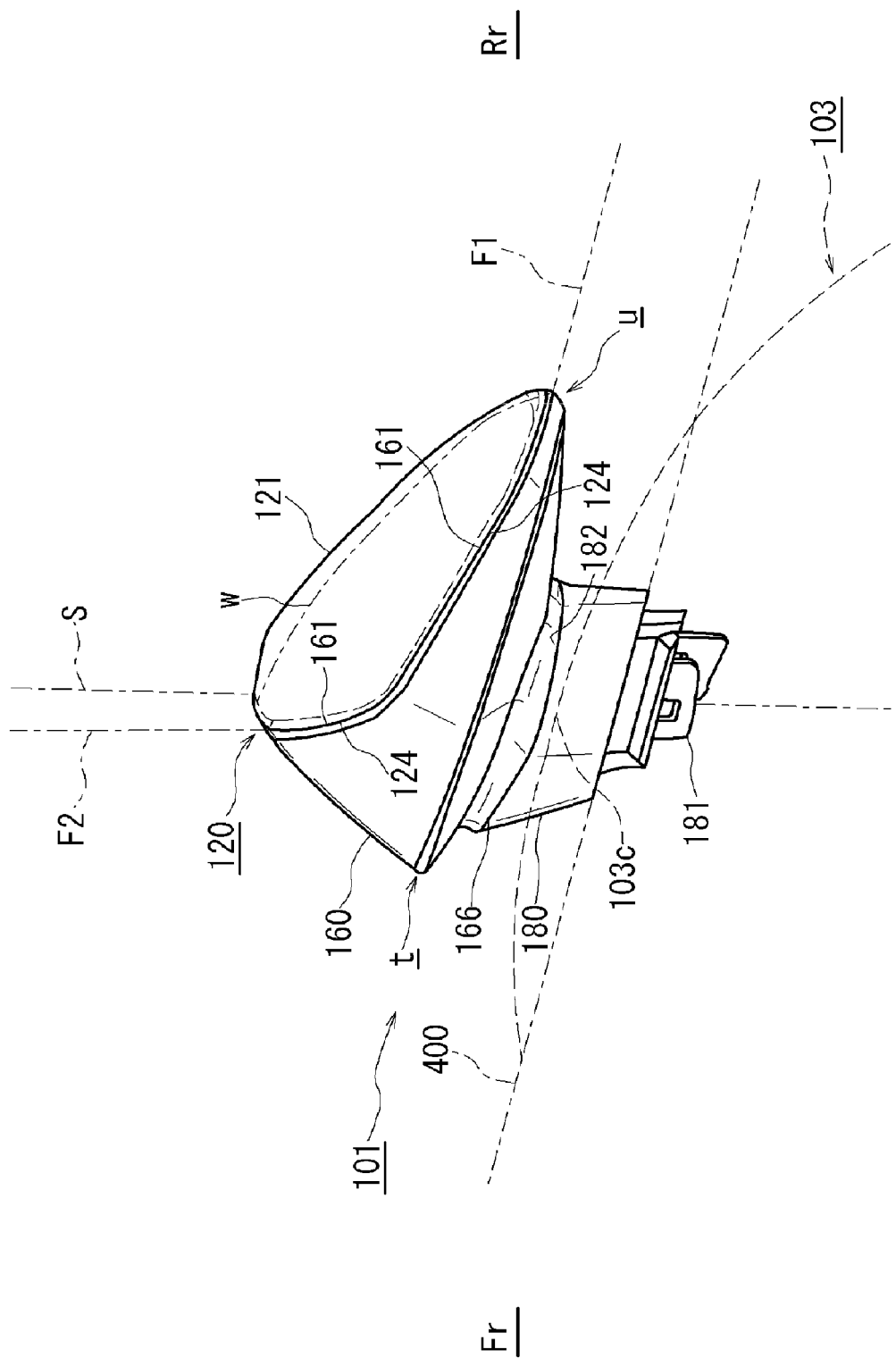
FIG. 3 is a perspective view showing a flasher of the straddle type vehicle according to the embodiment of the present invention.

As shown in FIG. 2, the tail lamp 103 is installed on the vehicle body cover 400 at the rear portion of the vehicle. Each of the flashers 101, provided separately from the tail lamp 103, is disposed on the vehicle widthwise side of the rear portion of the vehicle. In this embodiment, a mudguard component (rear fender) 502 is disposed behind a rear wheel 501. As shown in FIGS. 2 and 3, the flasher 101 has a leg 180 and is mounted on a base end 503 of the mudguard component 502 with the legs 180.

Figure 4:
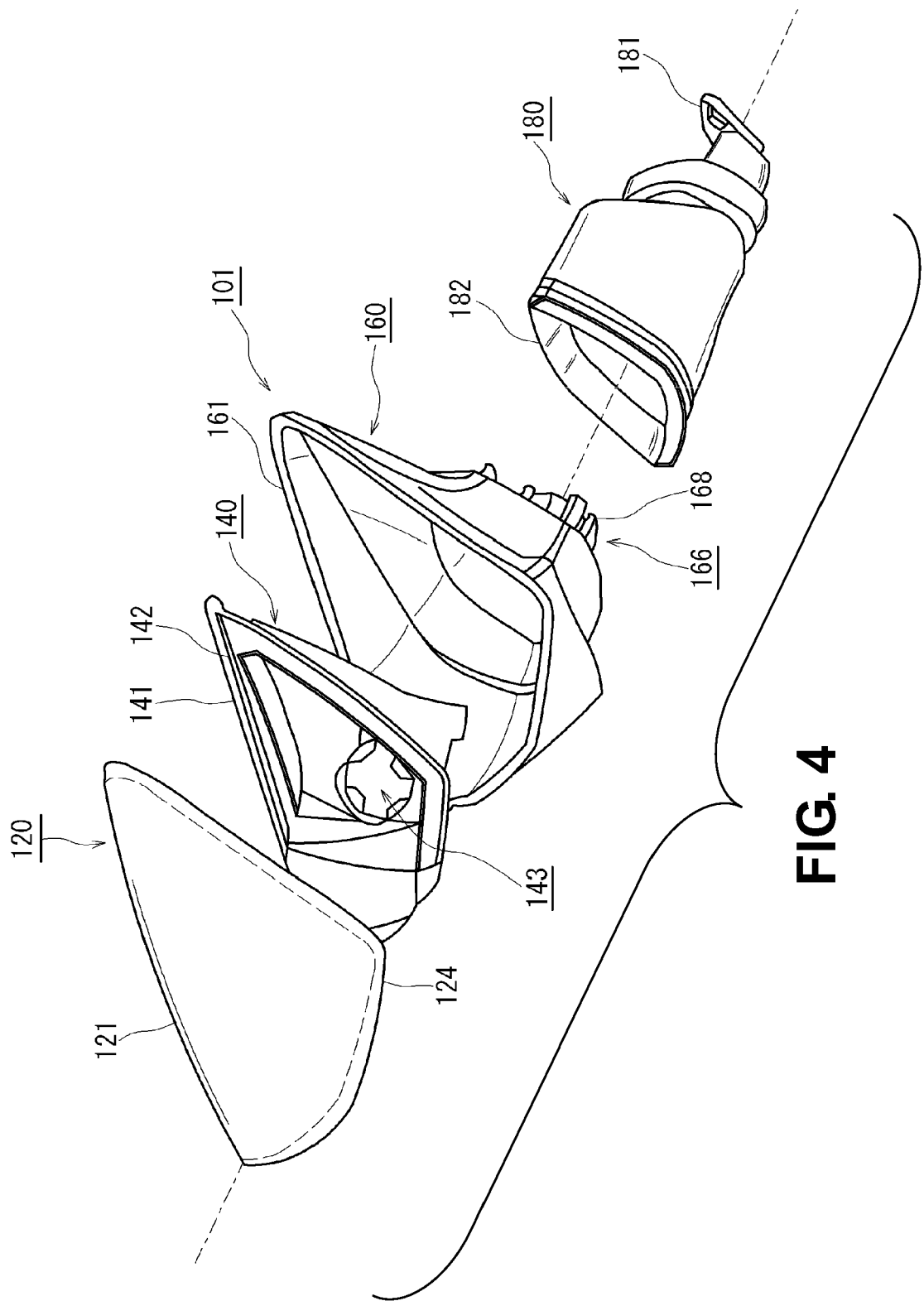
FIG. 4 is an exploded perspective view of the flasher according to the embodiment of the present invention.
Figure 5:
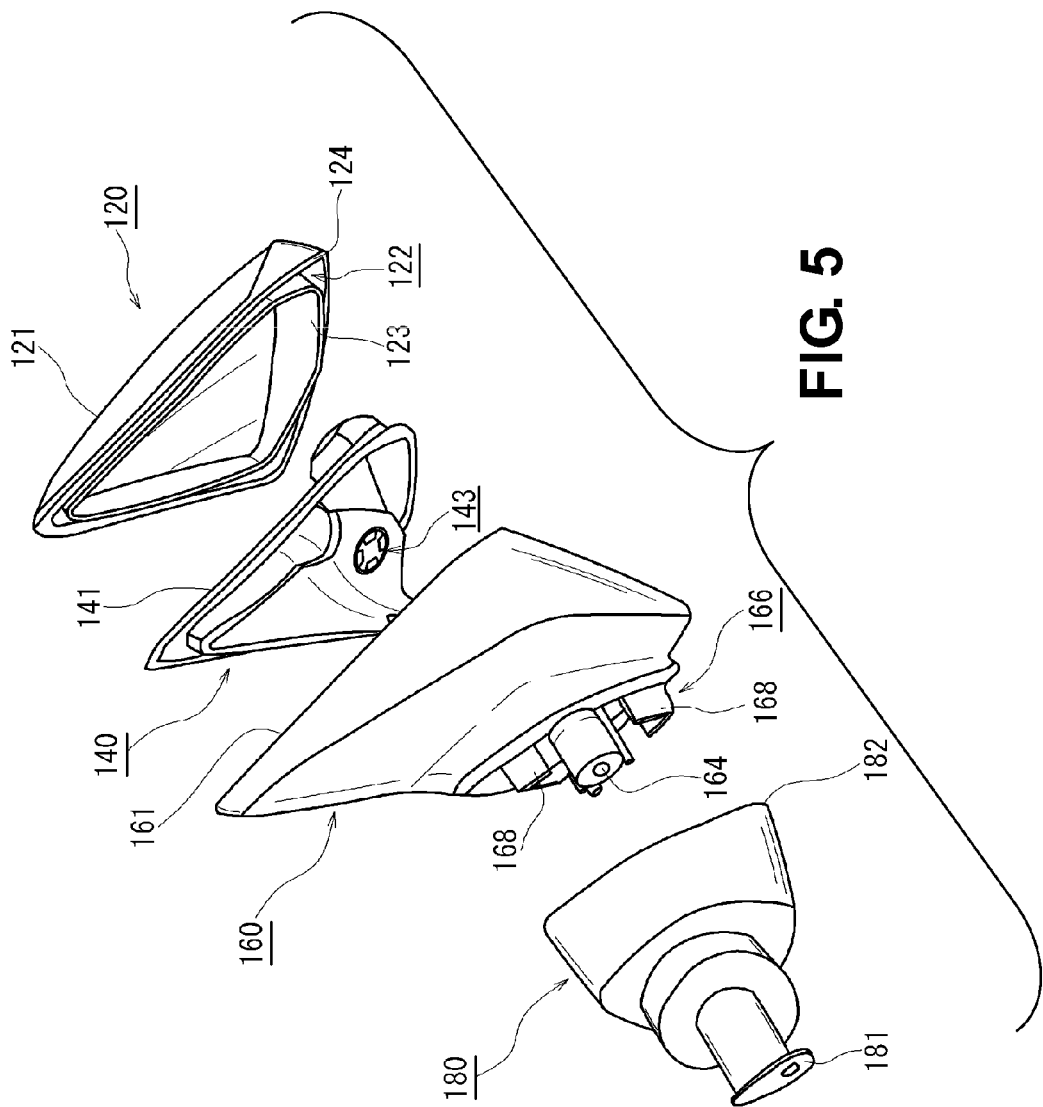
FIG. 5 is an exploded perspective view of the flasher according to the embodiment of the present invention.

As shown in FIGS. 4 and 5, the flasher 101 includes a lens 120, a housing 140, a cover 160, and the leg 180.

The lens 120 is molded with transparent resin (polymethylmethacrylate (PMMA) in this embodiment) and has a transparent lens surface 121. The lens 120 is provided, at the peripheral edge thereof, with a mounting portion 124 for mounting the cover 160 and a mounting portion 123 for mounting the housing 140. The mounting portion 123 for mounting the housing 140 is provided inside of the mounting portion 124 for mounting the cover 160. The lens 120 includes an opaque area formed between the mounting portion 124 for mounting the cover 160 and the mounting portion 123 for mounting the housing 140.

Figure 6:
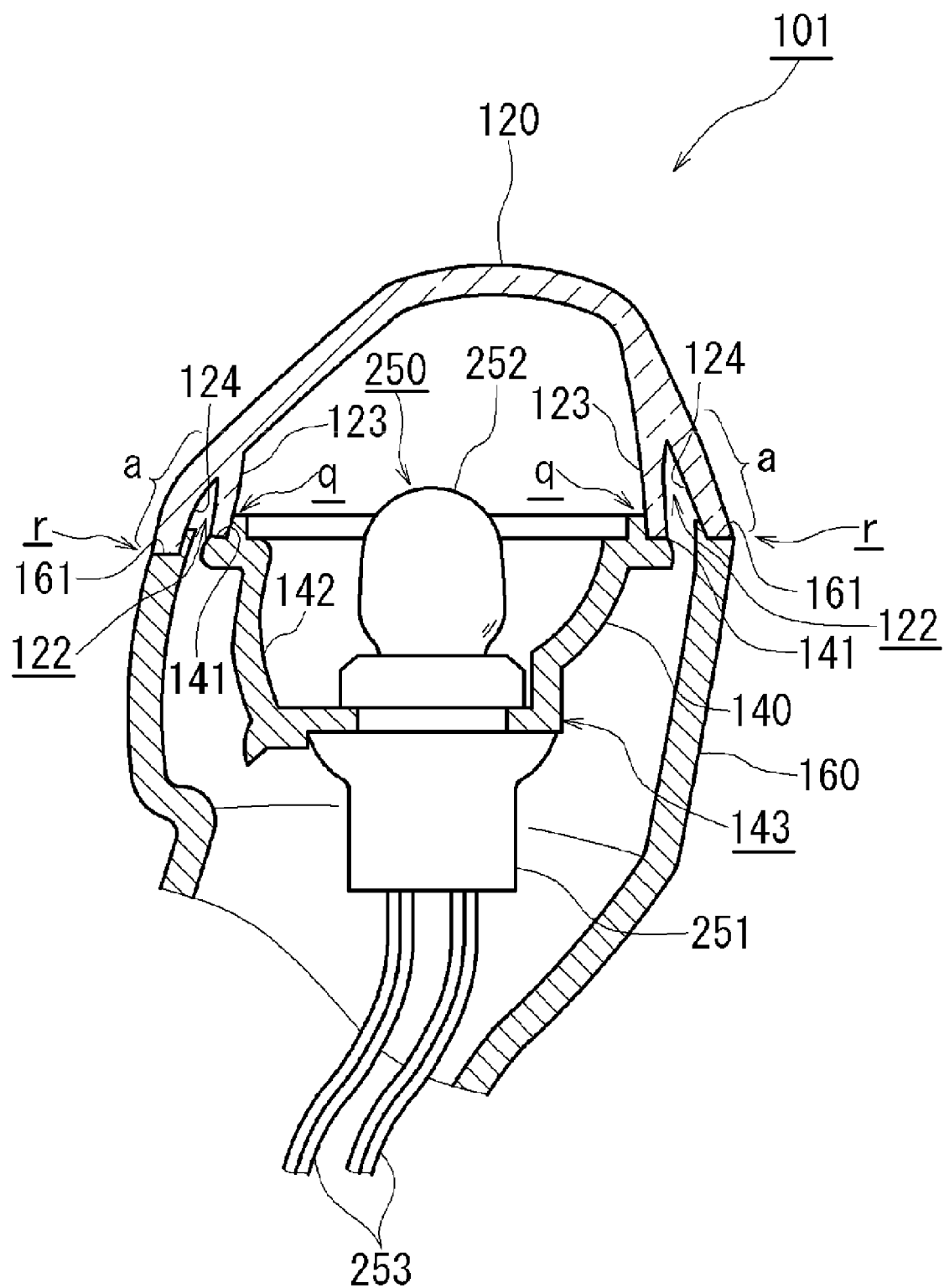
FIG. 6 is a cross-sectional view of the flasher according to the embodiment of the present invention.

In this embodiment, as shown in FIG. 6, an outer wall 124 (mounting portion 124) formed at the peripheral edge of the lens 120 and an inner wall 123 (mounting portion 123) formed inside the outer wall 124 are formed with the lens 120. The aforementioned opaque area is formed by coating the area "a" of the external portion of the outer wall 124 with an opaque paint. In this embodiment, the external portion of the outer wall 124 is coated along the entire peripheral edge of the lens 120 with a black paint.

In the housing 140, a bulb 250 (see FIG. 6) is provided as a light source. In this embodiment, as shown in FIG. 4, in the housing 140, the lens opposed side of the housing (casing) where the bulb 250 is disposed is formed into a generally recessed shape. The housing 140 is molded with resin (polycarbonate (PC) in this embodiment), and has a mirror finished surface 142 formed therein and facing the lens 120, the surface 142 constituting a reflector. The housing 140 also functions as a reflector. The mirror finish can be made by, for example, metal deposition or the like. The housing 140 includes a bulb attaching portion 143 in which a bulb 250 is attached. In this embodiment, as shown in FIG. 6, the bulb 250 is so disposed that its light emitting portion 252 is oriented toward the lens surface 121, while a socket 251 is secured to the bulb attaching portion 143. In this embodiment, the outer edge 141 of the housing 140 is placed on the mounting portion 123 (inner wall 123) formed inside the peripheral edge of the lens 120. More specifically, in this embodiment, the inner wall 123 of the lens 120 and the outer edge 141 of the housing 140 are placed in such a manner that their edges are in contact with each other. Besides, the outer edge 141 of the housing 140 is secured to the mounting portion 123 of the lens 120 by welding in a watertight manner.

As shown in FIG. 4, the cover 160 is a component for covering the outside of the housing 140, and is placed on the outer wall 124 of the lens 120. As shown in FIG. 6, the outer edge 161 of the cover 160 is placed on the mounting portion 124 (outer wall 124) formed at the periphery of the lens 120. More specifically, in this embodiment, the outer wall 124 of the lens 120 and the outer edge 161 of the cover 160 are in contact with each other. Furthermore, in this embodiment, a contact portion "q" where the inner wall 123 of the lens 120 is in contact with the outer edge 141 of the housing 140 and a contact portion "r" where the outer wall 124 of the lens 120 is in contact with the outer edge 161 of the cover 160 are offset in relation to the butted direction thereof.

As shown in FIG. 5, in this embodiment, the cover 160 is molded with resin (polypropylene (PP) in this embodiment), and includes an opening 164 for passing electrical wires 253 (see FIG. 6) for the bulb 250. The cover 160 is provided, at the outside surface thereof, with a mounting portion 166 for mounting the leg 180 around the opening 164. Furthermore, in this embodiment, the mounting portion 166 includes a turn stopper 168 formed there-around. In this embodiment, the turn stopper 168 includes engaging portions formed along a sharp curve on the periphery of an ellipse with which the long axis intersects.

As shown in FIGS. 4 and 5, the leg 180 is a component in a cylindrical form, and is secured at one end 181 thereof to the vehicle body cover 400 (see FIG. 2) and at the other end thereof to the mounting portion 166 of the cover 160 of the flasher 101. In this embodiment, the mounting portion 166 includes the turn stoppers 168 formed therein. The cover 160 of the flasher 101 is placed on the other end 182 of the leg 180 so as to be engaged with the turn stoppers 168. This allows the cover 160 to be mated with the leg 180. In this case, the leg 180 can be molded with an elastic material, for example, a rubber.

In this embodiment, the electrical wires 253 connected to the bulb 250 for the flasher 101, whose illustration is omitted, are electrically connected with a battery (not shown) in the straddle type vehicle 1000 through the cover 160, the leg 180, and the vehicle body cover 400 from the bulb attaching portion 143 of the housing 140.

In the flasher 101, the light emitted by the bulb 250 directly illuminates or is reflected at the inside of the housing 140 to illuminate the outside of the lens 120 through the transparent lens surface 121 of the lens 120. The direction of the light from the flasher 101 is adjusted by the housing or the like so that the light can be visually recognized from a predetermined region outside the flasher 101.

As shown in FIG. 6, in this flasher 101, the cover 160 is placed on the peripheral edge of the lens 120, and the housing 140 is placed on the peripheral edge of the lens 120 so as to be located at the inner side of the cover 160. The lens 120 has an opaque area "a" formed between the cover 160 and the housing 140. For this, even in the event of water entering the inside of the cover 160 around the peripheral edge of the lens 120, the water is not visible from the outside.

As shown in FIG. 3, in this flasher 101, the mating face of the cover 160 and the lens 120 is slanted with respect to the direction "s" in which the leg 180 extends, while the lens 120 is shorter in the vehicle widthwise direction than in the vehicle front-and-rear direction (i.e., vehicle lengthwise direction). This provides the flasher 101 with good conspicuity (in particular, a left-hand rear flasher providing good conspicuity as viewed from the left rear side of the vehicle and a right-hand rear flasher providing good conspicuity as viewed from the right rear side of the vehicle). In the event of the vehicle falling down, since the lens 120 is shorter in the vehicle widthwise direction than in the vehicle front-and-rear direction, an impact resulting from the vehicle falling down can be sustained along the longer front-and-rear direction of the vehicle, thereby protecting the lens 120 and the cover 160 against breakage due to the impact. In this embodiment, the leg 180 functions as a cushion against the impact of the vehicle falling down, preventing breakage of other components of the flasher 101. In particular, in this embodiment, the leg 180 is in a cylindrical form, and is molded with rubber which is more elastic and flexible than other components of the flasher 101. This more assuredly prevents breakage of other components in the event of vehicle falling down. The flasher 101, which functions as a cushion as mentioned above, prevents the vehicle body cover 400 from being broken or damaged. Furthermore, in this embodiment, since the lens 120 is shorter in the vehicle widthwise direction than in the vehicle front-and-rear direction, the conspicuity from the side and rear of the vehicle can be secured while restraining the flasher 101 from being protruded from the vehicle body. The installation of the flasher 101 on the vehicle body with the leg 180 results in a slender vehicle body cover design at the rear of the straddle type vehicle 1000. The flasher 101 can easily secure the conspicuity from the side and rear of the vehicle without requiring great projection in the vehicle widthwise direction, and also can enhance the flexibility in designing the vehicle body including the flasher 101.

The phrase "the direction "s" in which the leg 180 extends" refers to the direction in which the leg 180 extends from the vehicle body. Like this embodiment, if the leg 180 is formed by a hollow cylindrical member, such a direction can be thought to be the axial direction of the hollow cylindrical member. Alternatively, such a direction can be replaced by the vehicle widthwise direction (vehicle right-and-left direction).

In this embodiment, the vehicle body surface (the surface of the base end 503 of the mudguard component 502 in this embodiment) on which the leg 180 of the flasher 101 is mounted is oriented toward the rear of the vehicle, as shown in FIG. 2. For this, the lens 120 of the flasher 101 can easily be directed toward the rear of the vehicle, thereby ensuring conspicuity of the flasher 101 as viewed from the rear of the vehicle.

In this embodiment, the flasher 101 is tapered toward its front end "t" and rear end "u" along the vehicle lengthwise direction, as shown in FIG. 3. The lens 120 is formed into a configuration longer in the vehicle lengthwise direction, resulting in the lens surface 121 longer in the vehicle lengthwise direction. This provides a greater lens surface area visible from the side or the rear of the vehicle, leading to enhanced conspicuity of the flasher 101. Furthermore, although illustrations are omitted here, if the front end "t" and the rear end "u" are not tapered in the vehicle front-and-rear direction, for example, in the case of a flasher formed into a substantially quadrilateral shape as seen from the vehicle side, the front end "t" and the rear end "u" of the flasher 101 will largely protrude in the vehicle widthwise direction and/or in the vehicle up-and-down direction. In this embodiment, the flasher 101 is tapered toward its front end "t" and the rear end "u" along the vehicle lengthwise direction, as shown in FIG. 1. The vicinities of the front end "t" and the rear end "u" of the flasher 101 can be prevented from largely protruding in the vehicle widthwise direction and in the vehicle up-and-down direction, while ensuring the conspicuity of the flasher 101. This makes it difficult for the flasher 101 to be brought into contact with the ground in the event of falling down of the vehicle, thereby reducing the chance of breakage of the flasher 101.

Furthermore, in this embodiment, the rear end "u" of the flasher 101 is more sharply angled than the front end "t" of the flasher 101. This enables the flasher 101 to be extended in the vehicle rearward direction and also enables the lens surface 121 to be extended in the vehicle rearward direction. As a result, the lens surface area visible from the side and the rear of the vehicle is widely secured, and the conspicuity of the flasher 101 is improved.

In this embodiment, this straddle type vehicle 1000 is equipped with a tail lamp 103 at the rear thereof. As shown in FIGS. 1 and 2, the tail lamp 103 has a body portion 103a disposed at the vehicle rear side, and side portions 103b and 103c extending forward from the body portion 103a along both sides in the vehicle widthwise direction. In this embodiment, as shown in FIG. 3, the lens 120 of the flasher 101 is disposed along the side portions 103b and 103c of the tail lamp 103. This allows the flasher 101 and the tail lamp 103 at the rear of the straddle type vehicle 1000 to be disposed in a compact manner. Also, this makes it possible to create an integrated impression of the tail lamp 103 and the flasher 101.

In particular, in this embodiment, a ridge line "w," connecting the flasher front side end "t" and rear side end "u" along the lengthwise direction of the lens 120 of the flasher 101, extends along the side surface of the side portions 103b and 103c of the tail lamp 103, as shown in FIGS. 1 and 3. This enables a compact arrangement of the flasher 101 and the tail lamp 103 at the rear of the straddle type vehicle 1000, and also enables to create an integrated impression of the tail lamp 103 and the flasher 101. When the vehicle is viewed from the top, the outline of the lens 120 of the flasher 101 along the vehicle widthwise direction can be formed along the side surface of the side portions 103b and 103c of the tail lamp 103. This also enables a compact arrangement of the flasher 101 and the tail lamp 103 at the rear of the straddle type vehicle 1000, and also enables to create an integrated impression of the tail lamp 103 and the flasher 101.

In this embodiment, the mating face F1 of the edge 161 of the cover 160 and the edge 124 of the lens 120 extends along the side surface of the vehicle body cover 400, as shown in FIG. 3. In cases where the mating face F1 extends at least at one or more portions thereof along the side surface of the vehicle body cover 400, an integrated impression of the flasher 101 and the vehicle body cover 400 can be created, and an aesthetically attractive design impression can also be created.

In this embodiment, as shown in FIG. 3, the mating face of the edge 161 of the cover 160 and the edge 124 of the lens 120 includes two mating faces F1 and F2, one at the rear of the flasher 101 and the other at the front, while the mating face F1 at the front is more oriented toward the rear of the vehicle than the mating face F2 at the rear. Therefore, in particular, the flasher 101 can readily be seen from the side and the rear of the vehicle, thereby ensuring conspicuity as viewed from a prescribed range at the side and rear of the vehicle as well as implementing a relatively compact lens 120. In this case, as shown in FIG. 3, the mating face of the edge 161 of the cover 160 and the edge 124 of the lens 120 can be substantially divided into two mating faces F1 and F2, one at the rear and the other at the front of the flasher 101. The boundary can be smoothly continuous. The two mating faces F1 and F2 at the rear and the front of the flasher 101 need not be completely planar.

As shown in FIG. 3, in this embodiment, the mating face of the edge 161 of the cover 160 and the edge 124 of the lens 120 is slanted with respect to the direction "s" in which the leg 180 extends from the vehicle body cover 400, and the lens 120 is formed so that the frontal portion thereof is located more outwardly in the vehicle widthwise direction, resulting in enhanced conspicuity as viewed from the rear and the side of the vehicle.

In this embodiment, the straddle type vehicle 1000 is provided with a tandem footrest 411 and a grab bar 412, as shown in FIG. 2. When viewed from the rear side of the vehicle, the flasher 101 is disposed inside the lines L1 and L2 each connecting the widthwise tip end of the tandem footrest 411 and that of the grab bar 412. Therefore, in the event of vehicle falling down, the tandem footrest 411 and the grab bar 412 tend to be easily brought into contact with the ground than the flasher 101, thereby preventing the flasher 101 from contacting the ground. This in turn can prevent the breakage of the flasher 101 at the time of the vehicle falling down. The tandem footrests 411 are components on which tandem riders rest their feet, and are disposed at both sides of the straddle type vehicle 1000, as shown in FIGS. 1 and 2. The grab bar 412, disposed at the rear side of the vehicle 1000, is a component that tandem riders grasp during vehicle operation.

In this embodiment, the straddle type vehicle 1000 is provided with side covers 421 disposed under the seat 420, and the flasher 101 is disposed inside of the vehicle widthwise outermost position 421a of the side cover 421 as shown in FIGS. 1 and 2. Therefore, in the event of the vehicle falling down, the side cover 421 tends to be easily brought into contact with the ground than the flasher 101, thereby preventing the flasher 101 from contacting the ground. This in turn prevents the breakage of the flasher in the event of the falling down.

In this embodiment, the straddle type vehicle 1000 is provided with a muffler 430 disposed along the side surface of the vehicle body cover 400 as shown in FIG. 2. The flasher 101 is disposed inside of the vehicle widthwise outermost end of the muffler 430. Therefore, in the event of the vehicle falling down, the muffler 430 tends to be easily brought into contact with the ground than the flasher 101, thereby preventing the flasher 101 from contacting the ground. This in turn prevents the breakage of the flasher in the event of the vehicle falling down.

In this embodiment, the straddle type vehicle 1000 is provided with the tail lamp 103 at the rear portion of the vehicle as shown in FIG. 1. The lens 120 of the flasher 101 is disposed outside of the vehicle widthwise outermost end of the tail lamp 103 as shown in FIG. 2. The straddle type vehicle 1000 allows the lens 120 of the flasher 101 to be disposed outside of the vehicle widthwise outermost end of the tail lamp 103, thereby preventing the light from the tail lamp 103 from interrupting the light from the flasher 101, which in turn can secure the conspicuity of the flasher 101.

The flasher and the straddle type vehicle according to one embodiment of the present invention are described above. However, the flasher and the straddle type vehicle according to the present invention are not limited to the embodiment mentioned above. The present invention allows various modifications thereof.

For example, the structure of the flasher is not limited to the structure described above as an example in the aforementioned embodiment. For example, although a bulb is exemplified as the light source, the light source is not limited to such a bulb, but can be any appropriate component performing a light emitting function. For example, a light emitting element, such as, e.g., an LED, can be used. Also, the specific structure of the lens, housing, cover, and leg is not limited to the embodiment mentioned above. For straddle type vehicles, the aforementioned embodiment is just one example of the flasher according to the present invention, and therefore can be modified in various manners.

In this application, the language "motorcycle" is to be construed broadly and encompasses various motorized vehicles that are ridden by one or more rider, including, e.g., motorbikes, scooters, mopeds and other similar vehicles, which can include two wheeled vehicles and vehicles having more than two wheels.

In this application, the language "straddle type vehicle" includes, for example, motorcycles, snow mobiles, all terrain vehicles (ATVs), four-wheeled buggies, etc., which often involve vehicles that can be turned, tilted or otherwise affected by the driver's weight position. The terminology straddle type vehicle is not limited to vehicles in which a driver and/or passenger sits with legs straddling on opposite sides of a portion of the vehicle (such as, e.g., straddling a seat), but also includes vehicles in which a driver and/or passenger's legs can extend across a substantial portion of the width of the passenger-supporting portion of the vehicle, such that, by way of example, while a driver may sit with legs forward in a scooter, a scooter is understood to be a straddle type vehicle due to the ability of a driver and/or passenger to extend their legs across a substantial portion of the width of the passenger-supporting portion. In this manner, the driver of a straddle type vehicle is typically able to distribute their weight widthwise across the vehicle and to turn, tilt or otherwise influence the vehicle by the driver's weight position.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A rear flasher lamp arranged to be mounted on a rear portion of a vehicle body of a straddle type vehicle, the rear flasher lamp comprising:
   a lens;
   a cover mated with the lens; and
   a leg arranged to connect the cover with the vehicle body; wherein
   a first mating face between the cover and the lens is slanted outward in a vehicle width direction, defined as a right-and-left direction of the vehicle body, and slanted forward in a vehicle length direction, defined as a front-and-rear direction of the vehicle body, such that the first mating face extends more outward from the vehicle body in the vehicle width direction as the mating face extends more forward in the vehicle length direction; and
   the lens is shorter in the vehicle width direction than in the vehicle length direction.

2. The rear flasher lamp as recited in claim 1, wherein the first mating face is slanted with respect to a direction in which the leg extends from the vehicle body.

3. The rear flasher lamp as recited in claim 1, wherein the first mating face extends along a side surface of the vehicle body.

4. The rear flasher lamp as recited in claim 1, further comprising a second mating face, wherein the first mating face is located closer to the rear portion of the vehicle body than the second mating face.

5. The rear flasher lamp as recited in claim 1, wherein a front end of the lens protrudes more outwardly in the vehicle width direction than a rear end of the lens.

6. The rear flasher lamp as recited in claim 1, wherein the leg is made of a material more elastic and flexible than other components of the rear flasher lamp.

7. The rear flasher lamp as recited in claim 6, wherein the leg is made of molded rubber.

8. A straddle type vehicle comprising:
   a vehicle body; and
   the rear flasher lamp as recited in claim 1 mounted on a rear portion of the vehicle body.

9. The straddle type vehicle as recited in claim 8, wherein the first mating face extends along a side surface of the vehicle body.

10. The straddle type vehicle as recited in claim 8, further comprising a second mating face, wherein the first mating face is located closer to the rear portion of the vehicle body than the second mating face.

11. The straddle type vehicle as recited in claim 8, wherein a front end of the lens protrudes more outwardly in the vehicle width direction than a rear end of the lens.

12. The straddle type vehicle as recited in claim 8, further comprising a tandem footrest and a grab bar; wherein, when viewed from a rear of the vehicle body, the rear flasher lamp is disposed entirely inside, in the vehicle width direction, of a line connecting outermost ends of the tandem footrest and the grab bar.

13. The straddle type vehicle as recited in claim 8, further comprising a side cover disposed under a seat, wherein the rear flasher lamp is disposed entirely inside, in the vehicle width direction, of an outermost portion of the side cover.

14. The straddle type vehicle as recited in claim 8, further comprising a muffler disposed along a side surface of the vehicle body, wherein the rear flasher lamp is disposed entirely inside, in the vehicle width direction, of an outermost end of the muffler.

15. The straddle type vehicle as recited in claim 8, further comprising a tail lamp provided at the rear portion of the vehicle body, wherein the lens of the rear flasher lamp is disposed outside, in the vehicle width direction, of an outermost end of the tail lamp.

16. The straddle type vehicle as recited in claim 8, wherein a surface of the vehicle body on which the leg of the rear flasher lamp is mounted is located at the rear portion of the vehicle.

17. The straddle type vehicle as recited in claim 8, wherein a front end and a rear end of the rear flasher lamp are gradually tapered toward a front end and a rear end of the vehicle body, respectively.

18. The straddle type vehicle as recited in claim 8, wherein a rear end of the rear flasher lamp is more sharply angled than a front end of the rear flasher lamp.

19. The straddle type vehicle as recited in claim 8, further comprising a tail lamp provided at the rear portion of the vehicle, wherein the tail lamp includes a side portion extending forward along a side surface of the vehicle body, and the lens of the rear flasher lamp extends along the side surface of the vehicle from the side portion of the tail lamp.

20. The straddle type vehicle as recited in claim 19, wherein a ridge line connecting a front end of the rear flasher lamp and a rear end of the rear flasher lamp along the vehicle length direction extends along a side surface of the side portion of the tail lamp.

* * * * *